March 3, 1931.  G. CARLSON  1,795,196

CONNECTER

Filed May 24, 1928

Inventor:
George Carlson,
by Charles E. Tullar
His Attorney.

Patented Mar. 3, 1931

1,795,196

UNITED STATES PATENT OFFICE

GEORGE CARLSON, OF ANSONIA, CONNECTICUT, ASSIGNOR TO GENERAL ELECTRIC COMPANY, A CORPORATION OF NEW YORK

CONNECTER

Application filed May 24, 1928. Serial No. 280,302.

The present invention relates to electrical house wiring and more especially to the protective conduits and junction boxes in which the wires are installed.

The object of my invention is the provision of an improved connecter between conduit and junction box which may be installed with facility and without special tools, and when installed will insure electrical ground connection between box and conduit.

Figure 1:
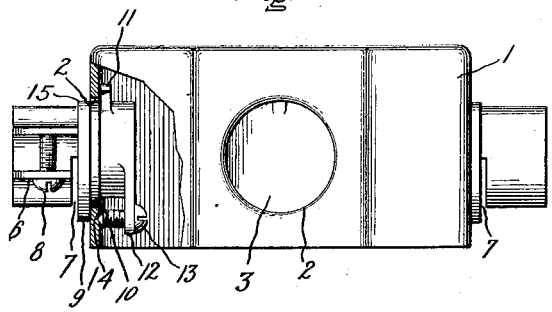
Figure 2:
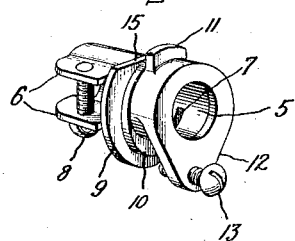

One embodiment of the invention is shown in the accompanying drawing in which Fig. 1 is a side elevation of an ordinary junction box with part broken away and connecters installed in opposite sides thereof, and Fig. 2 is a perspective view of the connecter.

The junction box 1 shown is of the usual type and is made of sheet steel with its surfaces customarily treated with rust resisting material, such as asphaltic varnish or other enamel, and in the side walls are numerous circular openings 2 each normally closed by a correspondingly-shaped disk or knock-out 3 so that by displacement thereof the conduits may be connected through any of the side walls as desired.

The conduit or tube connecter is made of malleable iron of general tubular shape with a central bore 5 for the reception therein of an end of the conduit to be connected and in order to clamp it upon the conduit its outer end is longitudinally cleft and provided with outturned lugs 6, and in order to permit them to be flexed or drawn together into engagement with the conduit a slit 7 is made transversely therein and the clamping is accomplished by turning home of a set screw 8 passing through one and tapped into the other of the outturned lugs 6.

A central transverse flange 9 is provided on the connecter to serve as a positioning or thrust shoulder for engagement with a side of the box 1 and on the inner or right-hand side of the flange is a projection in the form of an eccentric 10 of a diameter slightly less than the diameter of a box opening 2 and for a purpose to be set forth. A short lug 11 is provided on the connecter adjacent to and to the minimum radius of the eccentric 10, and on the opposite side of the connecter and spaced a distance from the eccentric is an arm 12 in the free end of which is threaded a set screw 13 having a pointed or spur end 14. The inner cylindrical portion of the connecter is of a diameter somewhat less than the diameter of a box opening 2.

To assemble the connecter in a box opening 2, the screw 13 is retracted and the arm 12 passed therethrough with the connecter in a tilted position and upon swinging the outer end past the normal the short lug 11 passes through, and upon moving the connecter into the normal and bodily moving sidewise in the direction in which the lug 11 points the eccentric 10 is caused to enter and substantially fill the opening 2 and thus serve to retain the connecter fixed against transverse movement. The flange 9 is cut away at 15 adjacent the lug 11 to permit the tilting of the connecter past the normal to enter the lug 11 in the opening.

After the connecter has been positioned in an opening 2, the set screw 13 is turned home and its spurred end 14 penetrates the insulating coating or enamel of the box and embeds itself in the metal thereof, thus effecting a positive clamping of the connecter against displacement either longitudinally or rotarily and a positive electrical connection with the box.

The conduit may be positively attached to the connecter either before or after the latter has been attached to the box as desired by turning home of the screw 8, independently of any other part of the connecter, and at the same time establish good electrical contact between the connecter and the conduit.

While I have shown and described the best embodiment of the invention known to me, I do not desire to be restricted thereto.

What I claim as new and desire to secure by Letters Patent of the United States is:

A connecter for securing electrical conduits in knock-out apertures for outlet boxes comprising a tubular body portion provided at its outer end with means to clamp the conduit end therein, an annular radial shoulder adapted to abut the outer surface of the box, an eccentric adjacent said shoulder adapted substantially to fill a knock-out hole in the box and prevent transverse movement of the connecter therein, a lug extending radially outwardly from said body portion and spaced from said shoulder freely to receive the thickness of the box wall therebetween, a radial arm diametrically located from said lug and spaced a greater distance from said shoulder, and a binding screw threaded in the outer end of said arm normal to said shoulder and adapted to clamp the wall of the box thereagainst.

In witness whereof, I have hereunto set my hand this twenty-first day of May, 1928.

GEORGE CARLSON.